Jan. 17, 1939.   R. A. GOEPFRICH   2,144,019
BRAKE
Filed March 1, 1937   2 Sheets-Sheet 1

INVENTOR
RUDOLPH A. GOEPFRICH
BY
ATTORNEY

Jan. 17, 1939.  R. A. GOEPFRICH  2,144,019
BRAKE
Filed March 1, 1937  2 Sheets-Sheet 2

INVENTOR
RUDOLPH A. GOEPFRICH
BY
ATTORNEY

Patented Jan. 17, 1939

2,144,019

UNITED STATES PATENT OFFICE 2,144,019

BRAKE

Rudolph A. Goepfrich, South Bend, Ind., assignor to Bendix Products Corporation, South Bend, Ind., a corporation of Indiana Application March 1, 1937, Serial No. 128,307

8 Claims. (Cl. 188—106)

This invention relates to brakes, and is illustrated as embodied in a cone type brake having an axially movable ring shaped shoe or friction member.

An object of the invention is to provide readily adjustable means for adjusting devices which are operated by the torque on the brake to intensify the applying forces acting axially on the friction member. Preferably the adjusting means is operated automatically whenever the wear of the brake becomes excessive.

Another object of the invention is to provide simple means for operating a brake of this character hydraulically for service and mechanically for emergency.

These and other objects and features of the invention, including various novel combinations of parts and desirable particular constructions, will be apparent from the following description of the illustrative embodiment shown in the accompanying drawings, in which.

Figure 1:
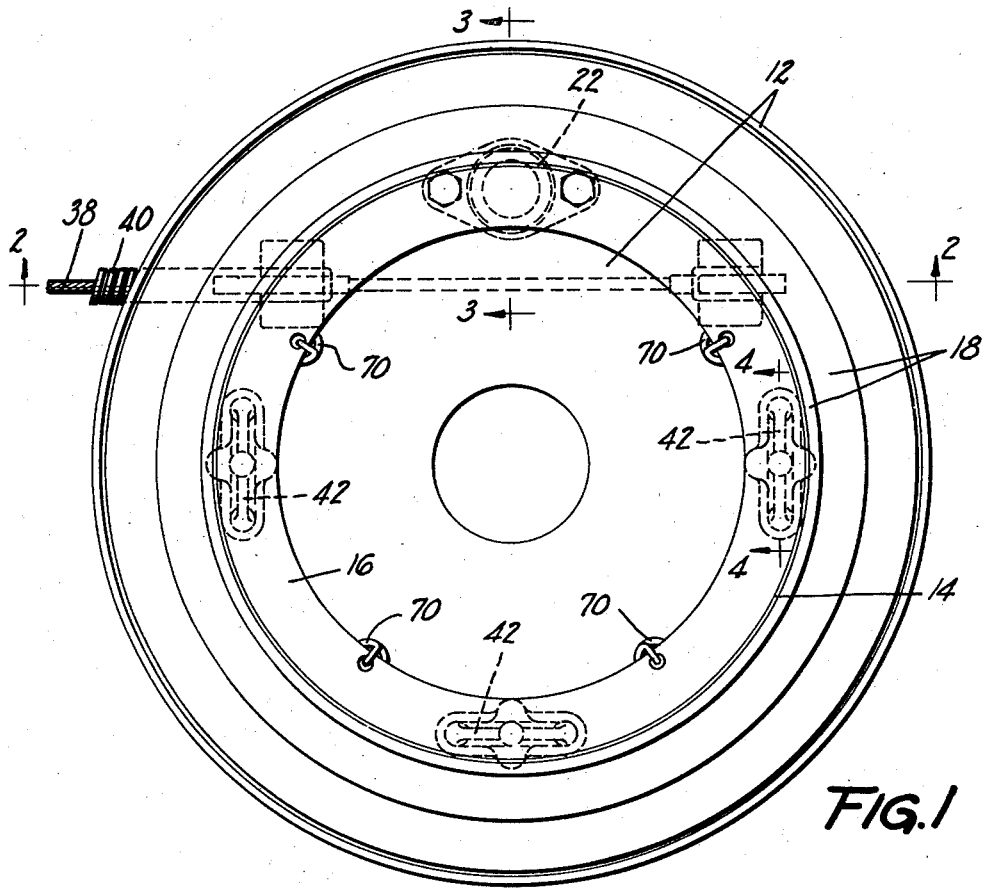
Figure 1 is a vertical section through the brake, just inside the head of the brake drum.
Figure 2:
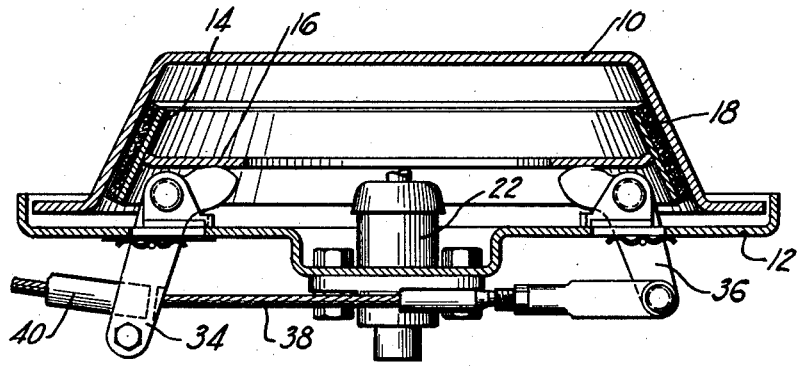
Figure 2 is a section horizontally through the brake, on the line 2—2 of Figure 1.
Figure 3:
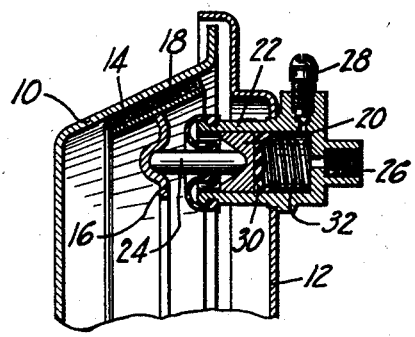
Figure 3 is a partial radial section through the brake, on the line 3—3 of Figure 1.

The illustrated brake, intended for use on the wheel of an automobile, includes a rotatable conical drum 10, at the open side of which is a support such as a backing plate 12, and within which is a ring shaped shoe having a conical rim 14 reinforced by a web 16 welded or otherwise attached at its outer edge to the center line of the rim of the shoe, and with its rim faced with suitable brake lining 18. The shoe 14—18 is movable axially to applied position in engagement with the drum 10 and, as explained below, has a limited angular movement when applied.

The brake is applied hydraulically for service, a piston 20, in a cylinder 22 mounted on the backing plate, being provided with a piston rod 24 pivotally seated at one end in a recess in the piston and at its other end in a recess in the web 16. The cylinder 22 is shown as having the usual intake port 26, bleeder plug 28, and rubber cup seal 30 held against the piston by a spring 32.

The brake also has mechanical "emergency" applying means including two levers 34 and 36 fulcrumed on the backing plate 12 and extending through slots in the backing plate, and which have rounded ends in thrust engagement with the web 16 on opposite sides of the hydraulic device 20—32. The lever 36 is operated by tension on a cable or the like 38, passing through a flexible conduit 40 which acts in compression on the lever 34. The cable 38 and the conduit 40 are parts of a Bowden-type control which is operated in the usual manner by the emergency hand lever or its equivalent.

Figure 4:
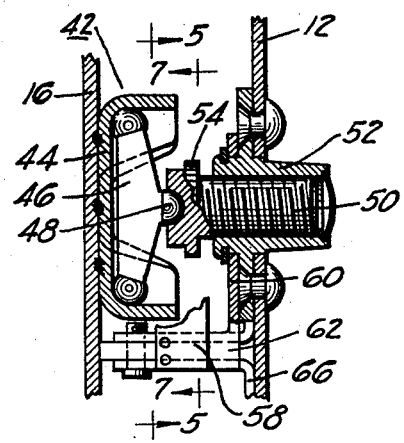
Figure 4 is a partial section through the brake, on the line 4—4 of Figure 1.
Figure 5:
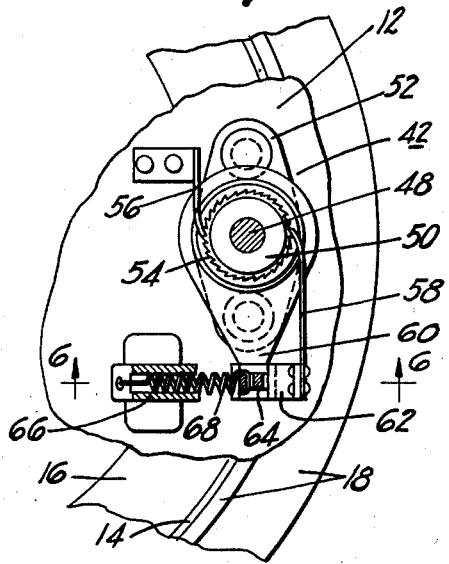
Figure 5 is a partial section on the line 5—5 of Figure 4.
Figure 6:
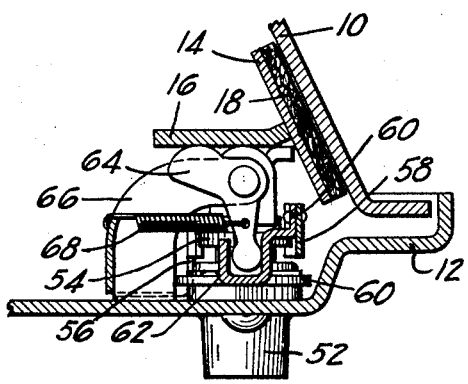
Figure 6 is a partial section on the line 6—6 of Figure 5.
Figure 7:
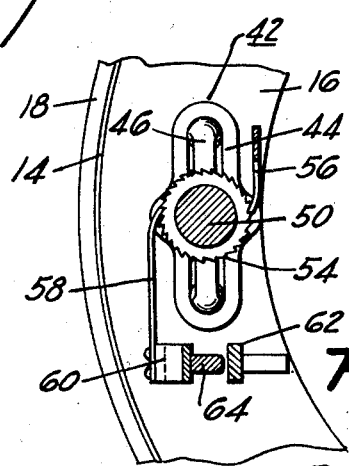
Figure 7 is a partial section on the line 7—7 of Figure 4.

The anchorage of the brake is on three devices 42 shown in detail in Figures 4 to 7. Each anchorage device includes a cup-shaped elongated stamping 44 welded to the side of the web 16. This stamping embraces the body of a lever 46 having rounded ends, one or the other of which pivots in the end of the stamping 44 when the friction member 14—18 moves angularly.

The lever 46 has a central fulcrum arrangement consisting of a rounded projection 48 seated in a socket in the end of a normally-fixed fulcrum member 50 threaded at right angles to the backing plate through a boss 52 riveted or otherwise secured to the backing plate.

It will be seen that, when the brake is applied, the drum urges the shoe frictionally angularly about the brake axis in one direction or the other, thus rocking the levers 46 in one direction or the other upon the fulcrums 50. This intensifies the applying force acting axially of the brake. The fulcrums 50 also serve as anchors, taking the braking torque.

I prefer to adjust the fulcrums 50 automatically whenever the wear of lining 18 becomes excessive, and to this end provide it with ratchet teeth 54 engaged by a spring holding pawl 56 mounted on the backing plate, and by an operating pawl 58. The pawl 58 is shown as a leaf spring pawl carried by one flange of a stamping 60 pivoted on the boss 52.

The stamping 60 is formed with a U-shaped portion 62, slightly wider (by an amount corresponding to the desired brake clearance) than the end of a lever 64 embraced thereby. The lever 64 is fulcrumed on a stamped bracket 66 carried by the backing plate, and has its opposite end rounded and held against the web 16 by a tensioned spring 68.

In the operation of the pawl and ratchet mechanism just described, the lever 64 is held by the spring 68 against the web 16, and follows it toward the drum when the brake is applied. If there is no undue wear, this merely takes up the clearance between the part 62 of the stamping 60.

If the lining has worn excessively, the lever 64 shifts the stamping 60 during the excess movement of the web 16, pulling the pawl 58 back where it will pick up the next tooth of the ratchet 54. When the brake is released, strong return springs 70, tensioned between the shoe and the backing plate, bring the shoe back to the released position determined by levers 46 when they return to the position shown in Figure 4. This causes the web 16 to operate the lever 64 to rock the stamping 60 back to its original position, thereby turning the fulcrum 50 in a direction to shift it toward the drum to compensate for the wear.

While one illustrative embodiment has been described in detail, it is not my intention to limit the scope of the invention to that particular embodiment, or otherwise than by the terms of the appended claims.

I claim:

1. A brake comprising an axially-movable friction member having a limited amount of angular movement, means actuated by said angular movement for intensifying the applying forces acting axially on said member, a hydraulic applying device for moving one part of said member to applied position, and interconnected mechanical applying devices arranged on opposite sides of said hydraulic device and acting on said member.

2. A brake comprising an axially-movable friction member, a hydraulic applying device at the top of said brake for moving said member about a fulcrum at the bottom of the brake to applied position, and interconnected mechanical applying devices arranged on opposite sides of the brake and acting on said member.

3. A brake comprising an axially-movable friction member, a hydraulic applying device for moving said member to applied position, interconnected mechanical applying devices arranged on opposite sides of said hydraulic device and acting on said member, and adjustably-fulcrumed devices swung by the torque on said member, when applied, to intensify the axially-directed applying forces acting on said member.

4. A brake comprising an axially movable friction member, a hydraulic applying device for moving said member to applied position, interconnected mechanical applying devices arranged on opposite sides of said hydraulic device and acting on said member, adjustably fulcrumed devices swung by the torque on said member, when applied, to intensify the axially directed applying forces acting on said member, and means operated by the movements of said member during the operation of the brake for automatically adjusting the fulcrums of said devices to compensate for wear of the brake.

5. A brake comprising supporting means, an axially movable friction member, centrally fulcrumed double ended levers extending generally circumferentially of the brake and engaging said member at their ends and rocked by the torque on said member in either forward or reverse braking, and fulcrums upon which said levers pivot and which are adjustable to shift the levers to compensate for wear of the brake, said fulcrums comprising members threaded axially of the brake through the supporting means.

6. A brake comprising supporting means, an axially movable friction member, levers extending generally circumferentially of the brake and engaging said member and rocked by the torque on said member during braking to exert an auxiliary axial applying force on said member, and fulcrums upon which said levers pivot and which are adjustable to shift the levers to compensate for wear of the brake, said fulcrums comprising members threaded axially of the brake through the supporting means.

7. A brake comprising an axially movable friction member, levers engaging said member and rocked by the torque on said member during braking to exert an auxiliary axial applying force on said member, fulcrums upon which said levers pivot and which are adjustable to shift the levers to compensate for wear of the brake, and means operated by the movement of said member during the operation of the brake for adjusting said fulcrums when the wear of the brake becomes excessive.

8. A brake comprising an axially movable friction member, levers engaging said member and rocked by the torque on said member during braking to exert an auxiliary axial applying force on said member, fulcrums upon which said levers pivot and which are adjustable to shift the levers to compensate for wear of the brake, and pawl-and-ratchet devices operated by the movement of said member during the operation of the brake for adjusting said fulcrums when the wear of the brake becomes excessive.

RUDOLPH A. GOEPFRICH.